US012646229B2

(12) United States Patent　　　　(10) Patent No.:　US 12,646,229 B2
Akhavan et al.　　　　　　　　　　(45) Date of Patent:　　Jun. 2, 2026

(54) IMAGE COLORIZATION FIDELITY ENHANCEMENT

(71) Applicant: Faurecia IRYStec Inc., Montreal (CA)

(72) Inventors: Tara Akhavan, Paris (FR); Hyunjin Yoo, Nepean (CA); Julien Muller, Paris (FR); Pranjay Shyam, Montreal (CA); Giovanni Mion, Montreal (CA); Jean Lorchat, Montreal (FR)

(73) Assignee: Faurecia IRYStec Inc., Montreal (CA)

( * ) Notice: Subject to any disclaimer, the term of this patent is extended or adjusted under 35 U.S.C. 154(b) by 116 days.

(21) Appl. No.: 18/404,593

(22) Filed: Jan. 4, 2024

(65) Prior Publication Data

US 2025/0225691 A1　　Jul. 10, 2025

(51) Int. Cl.
　　H04N 19/176　　(2014.01)
　　G06T 11/00　　(2006.01)
　　H04N 19/182　　(2014.01)
　　H04N 19/186　　(2014.01)
　　H04N 19/42　　(2014.01)
　　H04N 19/463　　(2014.01)
　　H04N 23/20　　(2023.01)

(52) U.S. Cl.
　　CPC ......... G06T 11/001 (2013.01); H04N 19/176 (2014.11); H04N 19/182 (2014.11); H04N 19/186 (2014.11); H04N 19/42 (2014.11); H04N 19/463 (2014.11); H04N 23/20 (2023.01)

(58) Field of Classification Search
　　CPC .. G06T 11/001; H04N 19/176; H04N 19/182; H04N 19/186; H04N 19/42; H04N 19/463; H04N 23/20

USPC ........................................................... 348/164
See application file for complete search history.

(56) References Cited

U.S. PATENT DOCUMENTS

2025/0117981 A1*　4/2025　Ren ........................ G06T 11/001

FOREIGN PATENT DOCUMENTS

| CN | 111696026 A | 9/2020 |
| CN | 114581552 A | 6/2022 |
| CN | 115170430 A | 10/2022 |
| CN | 116645569 A | 8/2023 |

(Continued)

OTHER PUBLICATIONS

Geonung et al., BigColor: Colorization using a Generative Color Prior for Natural Images; 17 pages.

(Continued)

*Primary Examiner* — Nguyen T Truong
(74) *Attorney, Agent, or Firm* — Reising Ethington P.C.

(57)　　　ABSTRACT

A system and method are provided for generating colorized image data for a single-channel image using a ML network, as well as a system and method for training the ML network. The image colorization method includes: obtaining single-channel image data representing a single-channel image; generating image feature data as a result of inputting the single-channel image data into an encoder; generating a pixel decoder output through inputting the image feature data into a pixel decoder; generating a color decoder output through inputting the image feature data into a color decoder; and generating colorized image data based on the color decoder output and the pixel decoder output, wherein the colorized image data represents a colorized version of the single-channel image.

20 Claims, 3 Drawing Sheets

(56) References Cited

FOREIGN PATENT DOCUMENTS

CN          116740211 A       9/2023

OTHER PUBLICATIONS

Yanxe Wu et al., Towards Vivid and Diverse Image Colorization with Generative Color Prior; Applied Research Center (ARC), Tencent PCG; 10 pages.
Wenzhe Shi et al., Real-Time Single Image and Video Super-Resolution Using an Efficient Sub-Pixel Convolutional Neural Network; arXiv:1609.05158v2 [cs.CV] Sep. 23, 2016; 10 pages.
Weng et al., CT2: Colorization Transformer via Color Tokens; NERCVT, School of Computer Science, Peking University, School of Artificial Intelligence, Beijing University of Posts and Telecommunications International Digital Economy Academy; 16 pages.
Feng et al., Semantic-aware Contrastive Learning for Electroencephalography-to-Text Generation with Curriculum Learning; Harbin Institute of Technology, China; negaarXiv:2301.09237v1 [cs.HC] Jan. 23, 2023; 10 pages.
Ji et al., ColorFormer: Image Colorization via Color Memory Assisted Hybrid-Attention Transformer; Youtu Lab, Tencent, Shanghai, China; Shanghai University, Shanghai, China; 17 pages.
Vaswani et al., Attention Is All You Need; 31st Conference on Neural Information Processing Systems (NIPS 2017), Long Beach, CA, USA.; arXiv:1706.03762v7 [cs.CL] Aug. 2, 2023; 15 pages.
Ba et al., Layer Normalization; aarXiv:1607.06450v1 [stat.ML] Jul. 21, 2016; 14 pages.

* cited by examiner

Figures 2, 4:
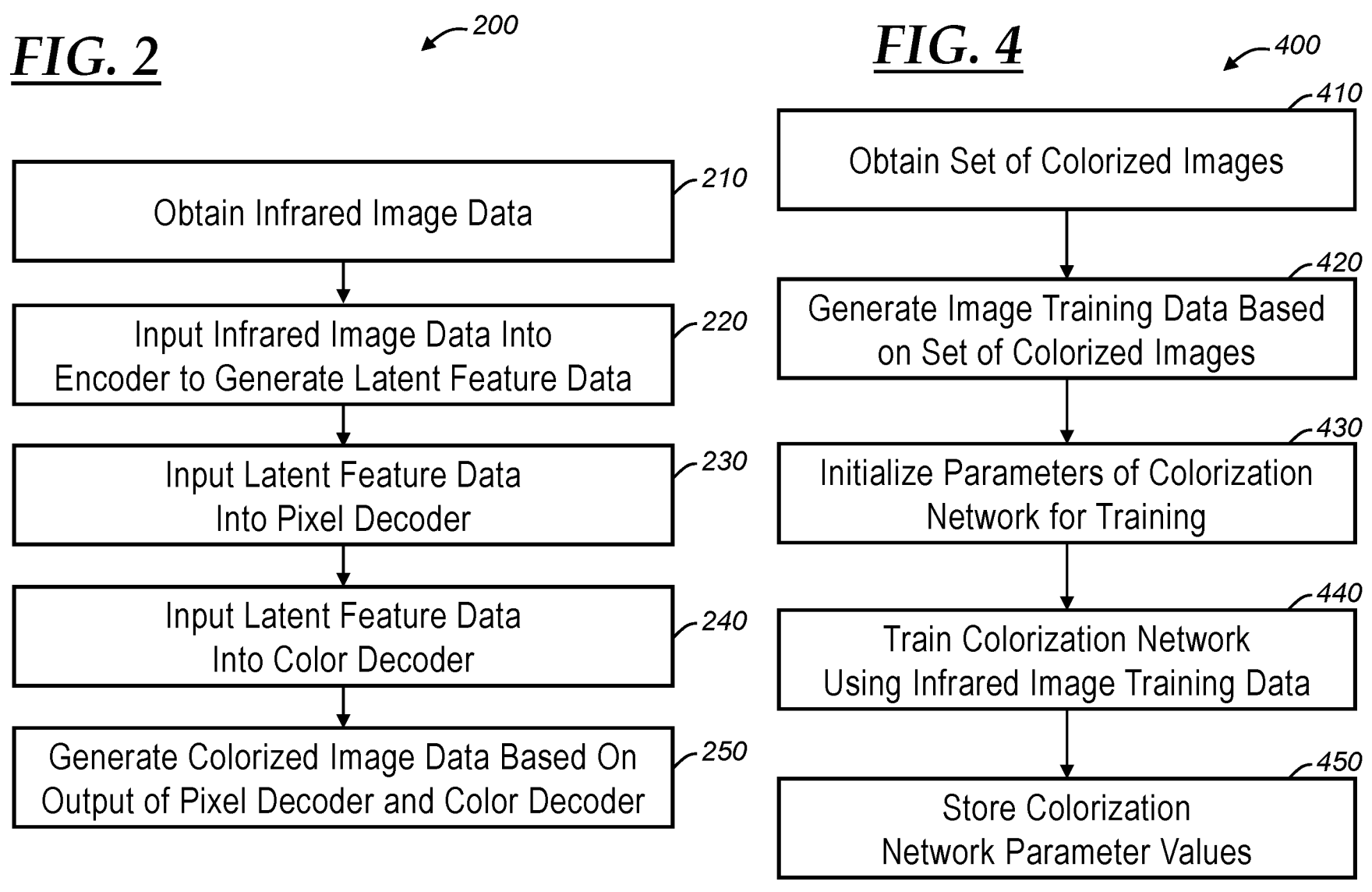

410 — Obtain Set of Colorized Images

420 — Generate Image Training Data Based on Set of Colorized Images

430 — Initialize Parameters of Colorization Network for Training

440 — Train Colorization Network Using Infrared Image Training Data

450 — Store Colorization Network Parameter Values

210 — Obtain Infrared Image Data

220 — Input Infrared Image Data Into Encoder to Generate Latent Feature Data

230 — Input Latent Feature Data Into Pixel Decoder

240 — Input Latent Feature Data Into Color Decoder

250 — Generate Colorized Image Data Based On Output of Pixel Decoder and Color Decoder

IMAGE COLORIZATION FIDELITY ENHANCEMENT

TECHNICAL FIELD

This invention relates to methods and systems for colorizing images, such as for colorizing infrared image data into colorized image data within an RGB or other visible light color space.

BACKGROUND

Infrared (IR) imaging technology has revolutionized various fields, including surveillance, medical imaging, and industrial applications. Infrared sensors are capable of capturing thermal radiation emitted by objects, enabling the visualization of temperature variations and the detection of objects even in low-light or obscured conditions. However, traditional infrared images lack the visual cues provided by the color spectrum, limiting their interpretability and usability as image sensors. In recent years, there has been a growing demand for more realistic colorization of infrared images. The ability to accurately represent temperature variations in a visually intuitive manner can greatly enhance the interpretability and usability of infrared imaging systems. By incorporating color information into infrared images, users can more easily identify objects, discern details, and make informed decisions based on the visual representation.

Currently, attempts have been made to colorize infrared images using various techniques, including false-color mapping and fusion with visible light images. However, these methods often result in unrealistic or inaccurate color representations, which can lead to misinterpretation and reduced effectiveness of infrared imaging systems. Therefore, there is a need for an improved approach to colorizing infrared images that provides more realistic and visually accurate representations.

SUMMARY

According to one aspect of the disclosure, there is provided a method of generating colorized image data for a single-channel image. The method includes: obtaining single-channel image data representing a single-channel image; generating image feature data as a result of inputting the single-channel image data into an encoder; generating a pixel decoder output through inputting the image feature data into a pixel decoder; generating a color decoder output through inputting the image feature data into a color decoder; and generating colorized image data based on the color decoder output and the pixel decoder output, wherein the colorized image data represents a colorized version of the single-channel image.

According to various embodiments, the method may further include any one of the following features or any technically-feasible combination of some or all of the features:
  the single-channel image is an infrared image and the single-channel image data is infrared image data representing the infrared image;
  the method includes capturing the infrared image using an infrared image sensor;
  the color decoder includes at least one learnable parameter, and wherein the at least one learnable parameter is used along with the image feature data by the color decoder in order to generate the color decoder output;

the color decoder is configured to use multi-headed self-attention (MSA) in order to determine the at least one learnable parameter;
  the color decoder is configured to perform attention based on visual features from at least two different scales; and/or
  the pixel decoder output is representative of luminance of the colorized image data, wherein the color decoder output is representative of chrominance of the colorized image data, and wherein the luminance as represented by the pixel decoder output is combined with the chrominance as represented by the color decoder output in order to generate the colorized image data.

According to another aspect of the disclosure, there is provided a method of training an image colorization network. The method includes: generating training data having a plurality of training data entries, wherein each training data entry of the plurality of training data entries includes a color image and a grayscale image that is a grayscale version of the color image; inputting the training data into an image colorization network, wherein the image colorization network is configured to generate a colorized version of the grayscale image based on a pixel decoder output and a color decoder output, wherein the pixel decoder output is generated by a pixel decoder of the image colorization network and the color decoder is generated by a color decoder of the image colorization network; and learning at least one color query parameter for the color decoder based on a learning operation for each training data entry of the plurality of training data entries, wherein the learning operation includes a comparison or difference between the colorized version of the grayscale image and the color image.

According to various embodiments, the method may further include any one of the following features or any technically-feasible combination of some or all of the features:
  the grayscale version of the color image is an infrared version of the color image and is generated through converting the color image to grayscale and leveraging mean and/or variation of pixel data of the color image in order to identify regions that are to exhibit high and/or low intensity regions as observed when an actual infrared image is captured; and/or
  the at least one color query parameter in memory for use during inference.

According to yet another aspect of the disclosure, there is provided a method of generating colorized image data for a single-channel image. The method includes: generating image feature data as a result of inputting single-channel image data into an encoder; generating a color decoder output through inputting the image feature data into a color decoder, wherein the color decoder uses at least one learnable parameter that is trained to generate chrominance information; and generating colorized image data based on the chrominance information and the image feature data, wherein the colorized image data represents a colorized version of the single-channel image.

According to various embodiments, the method may further include any one of the following features or any technically-feasible combination of some or all of the features:
  the at least one learnable parameter is used along with the image feature data by the color decoder in order to generate the color decoder output;
  the color decoder is configured to use multi-headed self-attention (MSA) in order to determine the at least one learnable parameter;

the color decoder is configured to perform attention based on visual features from at least two different scales;

a pixel decoder output is representative of luminance of the colorized image data, wherein the color decoder output is representative of the chrominance of the colorized image data, and wherein the luminance as represented by the pixel decoder output is combined with the chrominance as represented by the color decoder output in order to generate the colorized image data;

the single-channel image is an infrared image and the single-channel image data is infrared image data representing the infrared image;

capturing the infrared image using an infrared image sensor;

the method is performed by vehicle electronics of a vehicle; and/or the vehicle electronics of the vehicle includes the infrared image sensor configured to capture infrared image data as the single-channel image data, and wherein the colorized image data represents a color version of a scene captured by the infrared image sensor.

BRIEF DESCRIPTION OF THE DRAWINGS

Preferred exemplary embodiments will hereinafter be described in conjunction with the appended drawings, wherein like designations denote like elements, and wherein:

FIG. 2 is a flowchart illustrating a method of generating colorized image data for a single-channel image, such as an infrared image, according to one embodiment;

FIG. 4 is a flowchart illustrating a method of training an infrared image colorization network, which is used for performing the method of FIG. 2, according to one embodiment.

DETAILED DESCRIPTION

Figure 1:
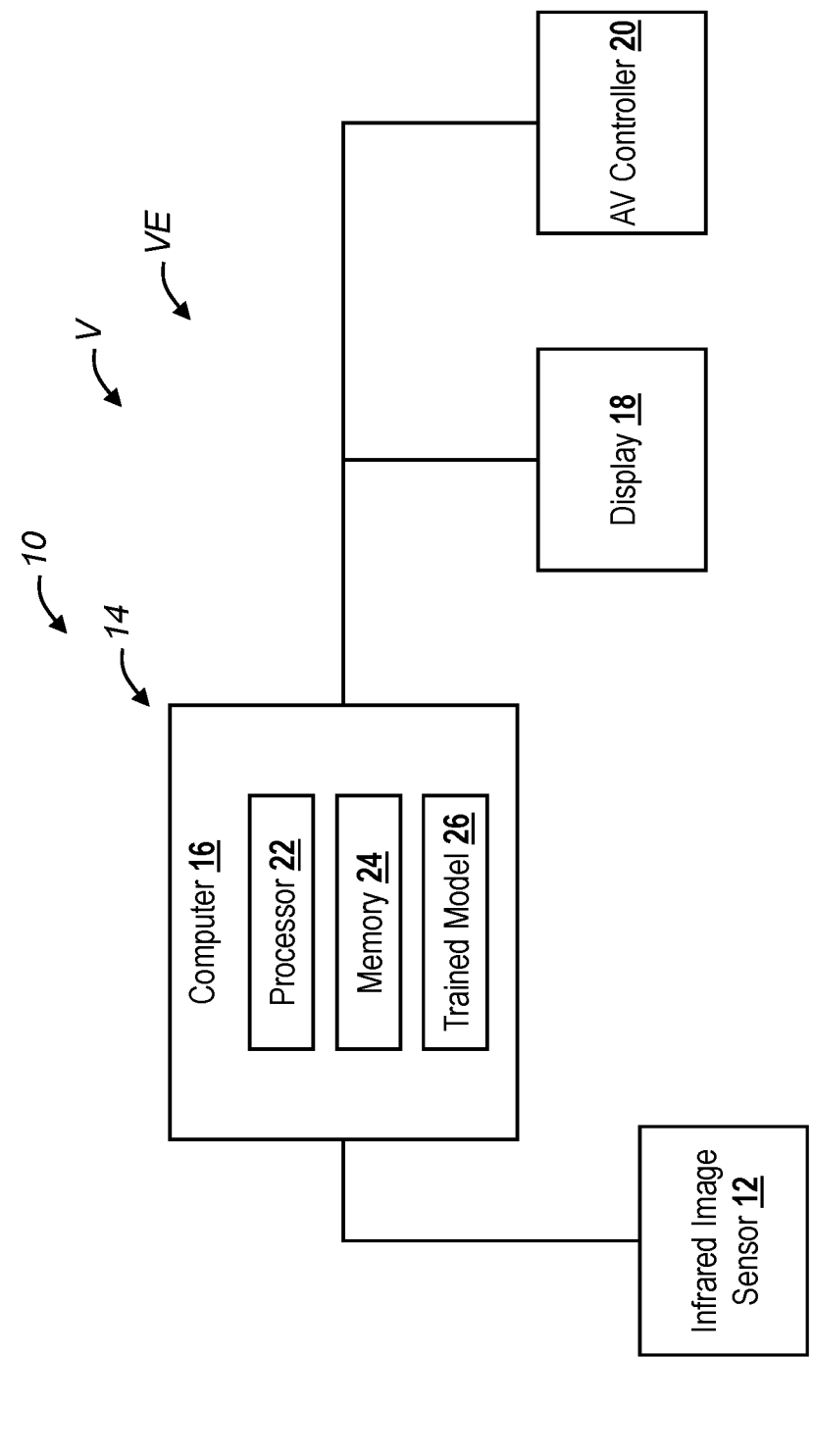
FIG. 1 is a block diagram illustrating an infrared image colorization system, according to one embodiment.

A system and method is provided for colorizing infrared images, particularly colorizing infrared images into a visible color space (e.g., RGB) with increased fidelity in regard to human perception of a scene, rendering the colorized images an accurate and natural representation of the scene as perceived by a human. As discussed above, infrared images lack color and are rendered in a single channel, and current methods for colorizing infrared images often result in unrealistic or inaccurate colors that do not accurately represent the natural colors of the objects being captured. Previous methodologies for colorizing infrared images relied upon additional priors, such as generative priors from pretrained generative adversarial networks (GANs), empirical distribution statistics, or pre-built semantic-color pairs. Such approaches require extensive pre-construction efforts and may have limited applicability in various scenarios. According to embodiments, to reduce reliance on manually designed priors, a query-based color decoder is proposed for determining color information for the colorized version of the image that is to be generated. The color decoder is composed of a stack of color decoder blocks, where each color decoder block (CDB) receives, as input, color queries as well as visual features represented by latent feature information generated by an encoder.

According to embodiments, there is provided a machine learning (ML) network, such as a convolution neural network (CNN), includes an encoder, a pixel decoder, and a color decoder. The encoder and the pixel decoder are configured as a U-Net with skip connections therebetween layers of coextensive dimensionality, with the encoder configured to generate latent feature information representative of visual features indicated or inferred from the input image. According to embodiments, a query-based transformer is used as the color decoder to determine color information from an input single-channel or grayscale image (referred to as a "single-channel image"), for example, infrared image data. The latent feature information generated by the encoder is also input into the color decoder along with color query parameters (also referred to as color embeddings) that are learned during training. The color decoder then decodes these queries to produce accurate colorization information, allowing for the mapping of grayscale images to their corresponding natural colors when combined with output of the pixel decoder. The output of the pixel decoder is then combined with the output color information provided by the color decoder, resulting in a colorized image that accurately represents a scene having colorized objects within the scene according to their natural appearances.

According to embodiments, the ML model is trained using automatically-generated training data entries, each having a color image paired with its grayscale or single-channel version. The automatically-generated training data entries may be generated by obtaining color photographs or other images, and then converting the colorized image into grayscale or single-channel representations, imitating infrared images as if they were captured by the camera instead of the visible light image.

In embodiments, the input infrared image is considered as the "L" component in the International Commission on Illumination (CIE) LAB color space, representing the lightness or luminance. The color decoder and pixel decoder work together to determine the chromatic components, "A" and "B", for each pixel. The "A" channel represents the green-red axis, while the "B" channel represents the blue-yellow axis. These "A" and "B" values, combined with the "L" component, allow for the generation of a colorized image that accurately represents the original infrared image with appropriate color information. By leveraging the Lab color space's color organization where the input image is used as the luminance component, along with the decoders' ability to determine chromatic values based on image features and learned color query parameters, enhanced colorization providing for increased interpretability is had, enabling viewers of the colorized image to easily identify objects, discern details, and make informed decisions based on the resulting colorized image.

Accurate colorization of infrared images as provided herein enables using an infrared image sensor to obtain colorized images of a scene within the field of view of the infrared image sensor. This may be useful for utilizing infrared image data without having to install a separate camera or other visible light sensor into the system. In the vehicle context, for example, it is often desirable to minimize the amount of hardware on the vehicle. Therefore, the present system and method enable utilizing infrared sensors to provide a colorized image data feed, such as an RGB video feed, while still ensuring reliability and consistency of colorization. For example, driver monitoring systems often include an infrared camera that faces the driver. These systems can capture and analyze the driver's facial expressions, eye movements, and head position to assess their level of alertness and detect any signs of distraction or drowsiness, for example. It would be desirable if the infrared sensor data could be used to enable colorized image/video of the vehicle, such as to enable effective videoconferencing or videocall capabilities.

Although the discussion of the embodiments below is in the context of a vehicle, such as a passenger automobile, it will be appreciated that the system and method may be applied to other systems that have an infrared image sensor, such as where there is a desire to use the infrared sensor data to enable colorized image/video of the system, which could be useful for videoconferencing or videocall capabilities, for example.

With reference to FIG. 1, there is shown an infrared image colorization system 10 for a vehicle V having an infrared image sensor 12, a processing subsystem 14 having at least one computer 16, a display 18, and an autonomous vehicle (AV) controller 20. The infrared image colorization system 10 is incorporated into vehicle electronics VE of the vehicle V, as shown in FIG. 1. However, in other embodiments, the infrared image colorization system 10 may be incorporated into another device, component, or system, such as a non-automotive or non-vehicular system, for example, in a smartphone. The display 18 and the AV controller 20 receive the colorized image data from the processing subsystem 14, but need not be included in other embodiments, and may be excluded or replaced with other components to which the colorized image data is provided.

The vehicle V may be a passenger automobile, such as a car, truck, SUV, etc. The vehicle electronics VE may further include a wireless transceiver, such as a cellular chipset, for sending and/or receiving data. In some embodiments, colorized image data is sent from the vehicle electronics VE to another device, such as a mobile device (e.g., smartphone) or another vehicle, for example. Also, it will be appreciated that, although the vehicle electronics VE is shown as including certain components, such as the display 18 and the AV controller 20, according to other embodiments, such components may be omitted and/or other components may be included.

The infrared image sensor 12 is a sensor that captures infrared (IR) radiation represented as an array of pixels that together constitute an infrared image, which is an example of a single-channel or grayscale image. As used herein, "IR" or "infrared" includes near-infrared (near IR), as well as mid-infrared (mid-IR) and far-infrared (far IR) radiation. The infrared image sensor 12 receives infrared light, which is then converted from its analog representation to a digital representation. The infrared image sensor 12 may be or include a CCD sensor, a CMOS sensor, or any other suitable type of sensor capable of capturing infrared radiation in image form. Various processing techniques may be used to prepare the infrared image for downstream processing, including, for example, noise reduction, contrast enhancement, image registration, and temperature calibration. These techniques aim to improve the quality and accuracy of the infrared image, making it suitable for further analysis, interpretation, and application-specific tasks.

According to embodiments, the infrared image is colorized and presented to a user for viewing, with the colorization of the image being adapted for enhanced interpretability and understanding as the ML network (or image colorization network) is trained for colorizing objects or features of the image in a natural manner. In embodiments, this colorization training is performed using a weakly-supervised training configuration by which training data entries are automatically generated through obtaining a color image, such as a photograph taken by a camera, and then converting the color image into a grayscale or single-channel image. In embodiments, other processing techniques for converting the color image into a single-channel image may be used, such as ones that seek to introduce artifacts observable within infrared images captured by an infrared imaging camera.

The processing subsystem 14 is for processing images captured by the infrared image sensor 12 in order to determine colorized image data representing the scene captured by the input infrared image. The processing subsystem 14 is configured to perform the method discussed herein. The processing subsystem 14 includes the at least one computer 16. In FIG. 1, the at least one computer 16 is illustrated as a single computer; however, it will be appreciated that multiple computers may be used as the at least one computer 16, together configured to perform the method and any other functionality attributed to the processing subsystem 14, as described herein. Each of the at least one computer 16 includes the at least one processor 22 and memory 24, with the memory 24 storing the computer instructions for execution by the at least one processor 22. It will also be appreciated that the computer instructions may be stored on different physical memory devices and/or executed by different processors or computers of the processing subsystem 14, together causing performance of the method and attributed functionality discussed herein.

In one embodiment, the at least one processor 22 is or includes a central processing unit (CPU) and a graphics processing unit (GPU) (or even a tensor processing unit (TPU)), each of which is used to perform different functionality of the processing subsystem 14. For example, a GPU is used for inference of neural networks (or any like machine learning models) as well as for any training, such as online training carried out for adaptable learning carried out after initial deployment; on the other hand, other functionality attributed to the processing subsystem 14 is performed by the CPU. Of course, this is but one example of an implementation for the at least one computer 16, as those skilled in the art will appreciate that other hardware devices and configurations may be used, oftentimes depending on the particular application in which the at least one computer 16 is used.

The at least one computer 16 is shown as including a trained image colorization pipeline (also referred to as a trained inference model) 26, which is stored as computer instructions on the memory 24 and executed by the processor 22. The trained image colorization pipeline or trained inference model 26 that process an input infrared image in order to generate a colorized version of the input infrared image, referred to as a colorized image and represented by colorized image data. The trained inference model 26 may include an inference encoder, a pixel decoder, and a color decoder, each of which may have a plurality of convolutional layers forming a CNN. The trained inference model 26 may be trained using a training subsystem (not shown) having one or more computers. In embodiments, color query parameters (or also referred to as embeddings) learned through a training process are stored in the memory 24 and used for inference, particularly by the color decoder.

With reference to FIG. 2, there is shown a method 200 of generating colorized image data for an infrared image. The method 200 is performed by the infrared image colorization system 10, according to one embodiment.

The method 200 begins with step 210, wherein infrared image data is obtained. The infrared image data is captured using the infrared image sensor 12. In embodiments, the infrared image data obtained here is single-channel image data, which is image data representing a single channel or grayscale. The infrared image sensor 12 may continuously capture infrared images that are then processed and/or stored in memory of the system 10. The infrared image sensor 12 captures infrared information of a scene within the FOV of the infrared image sensor 12. The infrared image data is obtained at the computer 16 and may be processed using various techniques, such as image enhancement techniques. The method 200 continues to step 220.

In step 220, image feature data is generated as a result of inputting the infrared image data into an encoder. The image feature data refers to feature information inferred or otherwise obtained from the infrared image data through one or more neural network layers, particularly, those of a CNN. The image feature data includes an encoder final output that is output by the last layer of the encoder, as well as intermediate outputs that are output by other layers besides the last layer, and used for decoding, such as when a U-Net configuration for the network is used. The method 200 continues to step 230.

In step 230, a pixel decoder output is generated through inputting the image feature data into a pixel decoder. The pixel decoder is a decoder that is a part of a U-Net and is used to upsample the image feature data. The pixel decoder may be composed of a suitable number of layers or stages, such as four stages that gradually expand the image resolution, where each stage includes an upsampling layer and a shortcut layer, and this is discussed below with respect to the embodiment of FIG. 3. The method 200 continues to step 240. In the present embodiment, step 240 is shown as being carried out after step 230; however, it will be appreciated that the step 240 may be performed prior to or at the same time as the step 230, according to embodiments.

In step 240, a color decoder output is generated through inputting the image feature data into a color decoder. The color decoder is used in place of other, existing colorization methods that rely on additional priors to achieve vivid results, as discussed more below with respect to FIG. 3. The color decoder is composed of a stack of color decoder blocks, where each color decoder block (CDB) receives visual features and color queries as input. The color decoder block (CDB) is designed based on a modified transformer decoder, and is configured to learn a set of adaptive color queries (represented as color query parameter values or color query parameter data) based on visual semantic information, learnable color embedding memories are introduced to store the sequence of color representations, which is discussed more below. The color decoder output includes correlations between semantic representations and colors, represented by color embeddings. The method 200 continues to step 250.

In step 250, colorized image data is generated based on the color decoder output and the pixel decoder output. The colorized image data represents a colorized version of the infrared image. The pixel decoder output and the color decoder output are used together and fused, using a fusion module, to generate a colorized image result. The pixel decoder output, which is the per-pixel image embedding $(E_i)$, represents the high-resolution image features, and captures the structure, details, and textures of the image, for example. This output is obtained through the step-by-step upsampling process of the pixel decoder, which gradually expands the image resolution. The color decoder output, which is the semantic-aware color embedding $(E_c)$, represents the color information and the relationship between color queries and visual embeddings, and is generated by the color decoder blocks using cross-attention and standard transformer layers. The color decoder leverages multi-scale features from the pixel decoder to make the color embedding more sensitive to semantic information and improve the identification of semantic boundaries. The per-pixel image embedding and the semantic-aware color embedding are combined, such as through using a dot product operation, and this enhances the features and captures the relationship between the image details and the color information. The result is an enhanced feature representation $(\hat{\mathcal{F}})$ that contains both the high-resolution image features and the color information. Finally, a 1×1 convolution layer is applied to the enhanced feature representation to generate the final output, which represents the AB color channel. This output is then concatenated with the grayscale input to obtain the colorized image result $(\hat{y})$. Accordingly, in embodiments, the pixel decoder output captures the high-resolution image features, while the color decoder output represents the color information and its relationship with the image features; then, the fusion module combines these outputs to generate a colorized image result that incorporates both the image details and the appropriate color information. The method 200 then ends.

Figure 3:
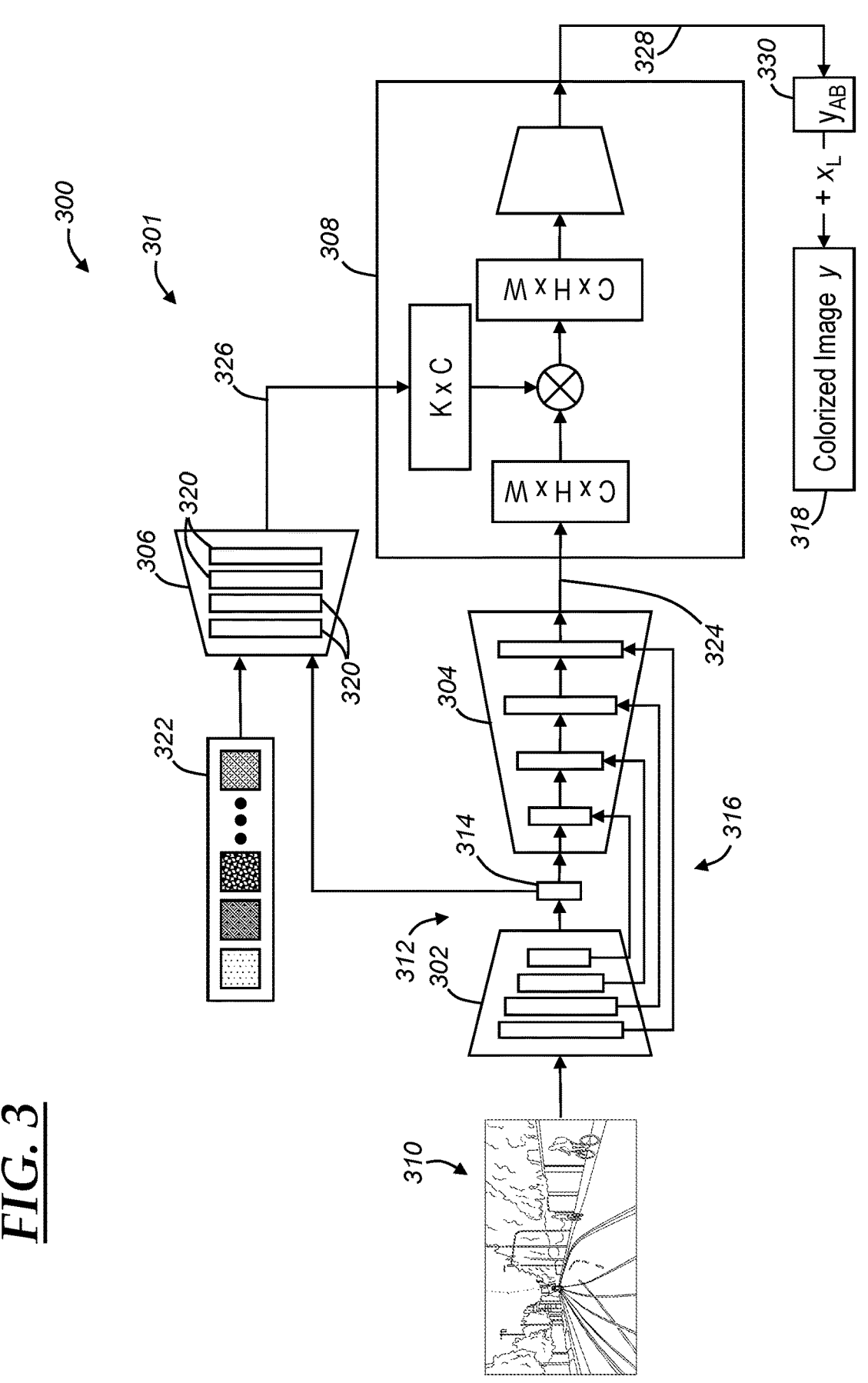
FIG. 3 is a block diagram depicting an image colorization network used as a part of the infrared image colorization system of FIG. 1, according to embodiment.

With reference to FIG. 3, there is shown an exemplary image colorization pipeline 300, which may be trained and used as the trained inference model 26 of the infrared image colorization system 10. The image colorization pipeline 300 may be more particularly referred to as an infrared image colorization pipeline 300 when used for colorizing infrared images. The image colorization pipeline 300 includes an image colorization network 301, and the colorization network 301 has an encoder 302, a pixel decoder 304, a color decoder 306, and a fusion module 308. Based on an input image 310, which may be an infrared image captured by the infrared image sensor 12, the encoder 302 generates image feature data 312. The image feature data 312 includes an encoder final output 314, which is the output of the last layer of the encoder 302.

The encoder 302 and the pixel decoder 304 are arranged in a U-Net configuration. A U-Net is a convolutional neural network (CNN) used primarily for image segmentation, and it has two main sections: an encoder and a decoder. The encoder 302 performs down-sampling of the input image, capturing feature representations at various levels through convolution and pooling operations. This process extracts contextual information from the image. The decoder 304 then up-samples these features to reconstruct the image, focusing on localization details necessary for segmentation. Skip connections 316 are a notable feature of the U-Net, linking layers of the encoder 302 to corresponding layers in the decoder 304. These connections 316 help in preserving spatial information through the network, enhancing the resolution and accuracy of the output.

Given an input infrared image, which is represented as a single-channel luminance channel $x_L \in \mathbb{R}^{\wedge}(H \times W \times 1)$, the colorization network predicts the two missing color channels $y_{AB} \in \mathbb{R}^{(H \times W \times 2)}$, where the L and AB (or ab) channels correspond to the luminance and chrominance in the CIE LAB color space, respectively. Herein, "LAB" or "Lab" or "CIE Lab" all each refer to the International Commission on Illumination (CIE) LAB color space, which is a color model used to describe colors perceptually. To extract high-level semantic information from grayscale images, a backbone network is utilized as the encoder 302. This encoder 302 is designed to extract image semantic embedding, which is important for colorization. When provided with $x_L$ as input, the encoder produces four intermediate feature maps with resolutions of H/4×W/4, H/8×W/8, H/16×W/16, and H/32× W/32. The first three feature maps are connected to the pixel decoder 304 through shortcut connections 316, while the last feature map serves as input to the color decoder 306. Accordingly, the decoder section of the network consists of the pixel decoder 304 and the color decoder 306. The pixel decoder 304 employs a series of stacked upsampling layers to restore the spatial resolution of the image features. Each upsampling layer has a shortcut connection 316 with the corresponding stage of the encoder. The color decoder 306 progressively refines semantic-aware color queries by leveraging multiple image features at different scales. Finally, the image and color features generated by the pixel decoder 304 and color decoder 306 are fused together to produce colorized image 318.

The pixel decoder 304 is composed of four stages that gradually expand the image resolution. Each stage includes an upsampling layer and a shortcut layer. Specifically, unlike previous methods that use deconvolution or interpolation, the present decoder 304 employs PixelShuffle (Shi, W., Caballero, J., Huszár, F., Totz, J., Aitken, A. P., Bishop, R., . . . & Wang, Z. (2016). Real-Time Single Image and Video Super-Resolution Using an Efficient Sub-Pixel Convolutional Neural Network. In Proceedings of the IEEE Conference on Computer Vision and Pattern Recognition (CVPR), pages 1874-1883) in the upsampling layer. This layer rearranges low-resolution feature maps with the shape of (H/p, W/p, $Cp^2$) into high-resolution ones with the shape of (H, W, C), with p representing the upsampling factor. The shortcut layer uses a convolution to integrate features from the corresponding stages of the encoder 302 through shortcut connections 316. The present network and method captures a complete image feature pyramid through a step-by-step upsampling process, which is beyond the capability of some transformer-based approaches. These multi-scale features are further utilized as input to the color decoder 306 to guide the optimization of color queries. The final output of the pixel decoder 304 is the image embedding $E_i \in \mathbb{R}^{(C \times H \times W)}$, which has the same spatial resolution as the input image.

The color decoder 306 includes one or more color decoder blocks and, in the present embodiment, includes a plurality, namely three, color decoder blocks 320, although it will be appreciated that the number of color decoder blocks may vary depending on the implementation or application in which the color decoder 306 is used. Many existing colorization methods rely on additional priors to achieve vivid results. For example, some methods (Wu, Y., Wang, X., Li, Y., Zhang, H., Zhao, X., & Shan, Y. (2021). Towards vivid and diverse image colorization with generative color prior. In Proceedings of the IEEE/CVF International Conference on Computer Vision (pp. 14377-14386); Kim, G., Kang, K., Kim, S., Lee, H., Kim, S., Kim, J., Baek, S.-H., & Cho, S. (2022). BigColor: Colorization using a Generative Color Prior for Natural Images. European Conference on Computer Vision (ECCV)) utilize generative priors from pretrained GANs, while others use empirical distribution statistics (Weng, S., Sun, J., Li, Y., Li, S., & Shi, B. (2022). CT2: Colorization Transformer via Color Tokens. In European Conference on Computer Vision (ECCV)) or pre-built semantic-color pairs (Ji, X., et al. (2022). ColorFormer: Image colorization via color memory assisted hybrid-attention transformer. In European Conference on Computer Vision (ECCV)) from training sets. However, these approaches require extensive pre-construction efforts and may have limited applicability in various scenarios. To reduce reliance on manually designed priors, a query-based color decoder is proposed. The color decoder 306 is composed of a stack of color decoder blocks 320, where each block 320 receives visual features (from the latent feature information generated by the encoder 302) and color queries as input. The color decoder block (CDB) 320 is designed based on a modified transformer decoder. In order to learn adaptive color queries based on visual semantic information, learnable color embedding memories are introduced to store a sequence of color representations: $Z_0 = [Z_0^1, Z_0^2, \ldots, Z_0^K] \in \mathbb{R}$ (K×C). Learnable color query parameters (or color embeddings) 322 are initialized to zero during the training phase and used as color queries in the first CDB. The correlation between semantic representation and color embedding is established through the cross-attention layer:

$$Z'_l = \mathrm{softmax}\ (Q_l K_l^T) V_l + Z_{l-1} \qquad \text{Equation (1)}$$

where l is the layer index, $Z_l$ in $\mathbb{R}^{(K \times C)}$ refers to K×C-dimensional color embeddings at the l-th layer, $Q_l = f\_Q(Z_{l-1})$ in $\mathbb{R}^{(K \times C)}$, and $K_l$, $V_L$ in $\mathbb{R}^{\wedge}(H_l \times W_l \times C)$ are the image features under the transformations f_K and f_V, respectively. $H_l$ and $W_l$ are the spatial resolutions of image features, and f_Q, f_K, and f_V are linear transformations. With the cross-attention operation, the color embedding representation is enriched by the image features. Standard transformer layers are then utilized to transform the color embedding, as follows:

$$Z''_l = MSA(LN(Z'_l)) + Z'_l \qquad \text{Equation (2)}$$

$$Z'''_l = MLP(LN(Z''_l)) + Z''_l \qquad \text{Equation (3)}$$

$$Z_l = LN(Z'''_l) \qquad \text{Equation (4)}$$

where MSA(·) indicates the multi-head self-attention (Vaswani, A., et al. (2017). Attention is all you need. In Advances in Neural Information Processing Systems (pp. 5998-6008)), MLP(·) denotes the feed forward network, and LN(·) is the layer normalization (Ba, J. L., Kiros, J. R., & Hinton, G. E. (2016). Layer normalization. arXiv preprint arXiv: 1607.06450). It is worth mentioning that cross-attention is operated before self-attention in the proposed CDB 320 of the present embodiment because the color queries are zero-initialized and semantically independent before the first self-attention layer is applied.

Previous transformer-based colorization methods often performed color attention on single-scale image feature maps and failed to adequately capture low-level semantic cues, potentially leading to color bleeding when dealing with complex contexts. To balance computational complexity and representation capacity, image features of three different scales are selected and used; specifically, the intermediate visual features generated by the pixel decoder 304 with downsample rates of 1/16, 1/8, and 1/4 are used in the color decoder 306. Color decoder blocks 320 are grouped in threes (i.e., three (3) CDBs per group), and in each group, the multi-scale features are fed to CDBs in a sequence. Although other groupings may be used in other embodiments. This is repeated for each group for M times in a round-robin fashion. In total, the color decoder 306 has of 3M CDBs 320:

$$E_c = ColorDecoder(Z_0, \mathcal{F}_1, \mathcal{F}_2, \mathcal{F}_3) \qquad \text{Equation (5)}$$

where $\mathcal{F}_1$, $\mathcal{F}_2$, and $\mathcal{F}_3$ are visual features at three different scales. The use of multi-scale features in the color decoder 306 enables modeling the relationship between color queries and visual embeddings, making the color embedding $E_c \in \mathbb{R}^{(K \times C)}$ more sensitive to semantic information, further enabling more accurate identification of semantic boundaries and less color bleeding.

The fusion module 308 is a lightweight module that combines the outputs of the pixel decoder and the color decoder to generate a color result. The inputs to the fusion module 308 are the per-pixel image embedding $E_i \in \mathbb{R}^{(C \times H \times W)}$ (referred to as per-pixel image embedding 324) from the pixel decoder 304, where C is the embedding dimension, and the semantic-aware color embedding $E_c \in \mathbb{R}^{(K \times C)}$ (referred to as semantic-aware color embedding 326) from the color decoder, where K is the number of color queries. The fusion module 308 aggregates these two embeddings 324,326 to form an enhanced feature $\mathcal{F} \in \mathbb{R}^{(K \times H \times W)}$ using a simple dot product, which may be referred to as enhanced feature data 328. A 1×1 convolution layer is then applied to generate the final output $\hat{y}_{AB} \in \mathbb{R}^{\wedge}(2 \times H \times W)$, which represents the AB color channel 330.

$$\hat{\mathcal{F}} = E_c \cdot E_i \qquad \text{Equation (6)}$$

$$\hat{y}_{AB} = Conv(\hat{\mathcal{F}}) \qquad \text{Equation (7)}$$

Finally, the colorization result $\hat{y}$ (also referred to as the colorized image data 318) is obtained by concatenating the output $\hat{y}_{AB}$ with the grayscale input $x_L$.

With reference to FIG. 4, training an infrared image colorization network and, more particularly, training the inference model through use of a teacher model that supervises outputs of the inference model during training. The method 400 begins step 410, wherein a set of color images is obtained. The set of color images is a plurality of images having color, such as a graphic rendered using RGB or a photograph taken in a visible light color space. Accordingly, unlike the colorized images, the color images in the set of color images are already in color, such as photographs, and there may be thousands or even millions of them. In one embodiment, the color images are represented by RGB image data. These images may be programmatically obtained using any of a variety of various methods, such as web scraping, accessing a database, or using an API to retrieve the images from a remote source. The specific approach would depend on the availability and accessibility of the images that are desired. The method continues to step 420.

In step 420, infrared image training data is generated based on the set of colorized images. This data is used to train the image colorization network 301, including the encoder 302, the pixel decoder 304, and the color decoder 306. The infrared image training data is created by converting the colorized images into grayscale images, which represent the single-channel luminance channel. In embodiments, to generate infrared image training data based on the set of colorized images, the colorized images are converted into grayscale images by using various image processing libraries or tools available in programming languages such as Python or MATLAB. The grayscale images represent the single-channel luminance channel, which is an essential component for training the colorization network. By converting the colorized images to grayscale, a training dataset is created that focuses on the luminance information, which can help the network learn how to accurately generate colorized images based on grayscale input.

In regard to using the image colorization for infrared images, converting color images to grayscale does not capture variations in modalities observed between grayscaled color images (i.e., color images converted to grayscale or a single channel) and infrared images, such as, for example, due to differences in the spectral range and intensity of infrared light. That is, when converting color images to grayscale, variations in modalities observed between grayscale color images and infrared images are not captured because grayscale color images are essentially color images converted to a single channel, while infrared images have distinct differences in spectral range and intensity of infrared light. These differences can affect the overall performance of the image colorization network 301 as the domain used for training is different than that used for inference. To account for this, several imaging properties, such as variations in mean and variation within the image at a patch level, are leveraged to introduce multiple high and low intensity zones mimicking an infrared image. By considering the mean and variation within the image at a patch level, regions are identified in the grayscale image that exhibit similar characteristics to infrared images. For example, areas with higher mean values and lower variation may correspond to regions of higher intensity in an infrared image, while areas with lower mean values and higher variation may correspond to regions of lower intensity. Accordingly, by introducing these high and low intensity zones, the appearance of an infrared image is simulated and unique properties observed in infrared imaging are captured. This approach allows for a more accurate representation of infrared images compared to simple grayscale conversion. By considering multiple imaging properties and incorporating high and low intensity zones, the nuances and variations present in infrared imagery are aptly captured, ultimately improving the colorization process for infrared images. These grayscale images having taken into account the nuances noted above are referred to as simulated infrared images, which is represented by simulated infrared image data. The method continues to step 430.

In step 430, the parameters of the colorization network are initialized for training. This involves setting the initial values for the weights and biases of the network's layers, including learnable weights and parameters of the encoder 302, the pixel decoder 304, and the color decoder 306. By initializing the parameters, the network is prepared to learn and adjust its internal values during the training process. These initial values serve as starting points for the network to optimize its performance in generating accurate and visually appealing colorized images. Learnable color embeddings 322 for the color decoder 306 are initialized to zero and are used as color queries in the first color decoder block 320 of the color decoder 306. The method continues to step 440.

In step 440, the colorization network is trained using the infrared image training data. This involves feeding the grayscale images into the network and adjusting the network's parameters through a process called backpropagation. In embodiments, the training process involves using the infrared image training data that includes pairs of color data and their corresponding grayscale versions—that is, each color image has a grayscale counterpart or "grayscaled color image". This approach is known as supervised learning, particularly weakly-supervised learning in the sense that the available labels or annotations may not fully capture the intricacies or nuances of the target domain.

During the training phase, the image colorization network 301 learns to understand the relationship between the grayscale input images (or simulated infrared images) and their corresponding color images. The network aims to predict the color information based on the given grayscale input. The training data is usually collected by pairing color images with their grayscale counterparts. The color images serve as the ground truth, providing the correct color information for each corresponding grayscale image. The grayscale images, on the other hand, act as the input for the network. The image colorization network 301 is trained using these paired examples, doing so through an iterative process where it receives a grayscale image as input and generates a colorized version as output. The network's output is then compared to the ground truth color image, and the difference between them is measured using a loss function. The loss function quantifies the discrepancy between the predicted colorization and the actual colorization. The network's parameters, including the learnable color query parameters or embeddings 322, are adjusted through backpropagation and gradient descent, aiming to minimize this loss function. This process continues for multiple iterations, gradually improving the network's ability to accurately colorize grayscale images. By training on a large dataset of paired color and grayscale images, the image colorization network 301 learns to generalize and apply the learned colorization patterns to unseen grayscale images. This enables the image colorization network 301 to effectively colorize infrared images by leveraging the knowledge gained from the training data.

In embodiments, particularly those where the infrared image sensor is to be facing one or more persons, such as a driver or passenger of a vehicle, the image colorization network may be fine-tuned to provide even more enhanced fidelity for such a target domain often having people's faces within the field of view. In such embodiments, after training the image colorization network 301 on natural scenes using a large corpus of images, the network 301 is further refined to ensure accurate retention of facial color for diverse ethnic groups. To achieve this, a subsequent step involves fine-tuning the network on a face dataset. The purpose of this fine-tuning process is to specifically focus on capturing and preserving facial color information. By using the face dataset, which includes a diverse range of ethnic groups, the network can learn to recognize and reproduce accurate facial colors across different races and ethnicities. This fine-tuning step helps address any potential biases or limitations that may arise from training solely on natural scenes. Faces have unique color characteristics and variations that may not be fully captured by training on a general dataset. By fine-tuning on an internal face dataset, the network can adapt and learn specific color nuances related to facial features, ensuring that the colorization process accurately represents the diversity of human skin tones. Incorporating this additional step in the training process results in the colorization network becoming more robust and capable of accurately reproducing facial color for individuals from various ethnic backgrounds.

When applying a colorization mechanism to facial images (i.e., images having faces), racial consistency and accurate reconstruction of body parts are often important aspects to consider. To achieve this, the use of local discriminators focusing on multi-scale local patch distributions based on the receptive field size is used, according to embodiments. These discriminative losses are applied strategically to separate semantic facial regions, such as the left and right eyes, hair, and mouth, aligning with the part-aware objective. To address potential biases caused by imbalanced dataset distribution, which may result in inconsistent or inaccurate colorization, a racial restoration accuracy-based sampling approach is implemented. This approach aims to increase the representation of poorly colorized images, effectively capturing the long tail in the dataset and improving the performance of the neural network. By adopting this methodology, an overall enhancement in the performance of the colorization mechanism, especially in handling long tail scenarios, is anticipated. The method 400 continues to step 450.

In step 450, the parameter values of the colorization network are stored for later use during inference. These parameter values represent the learned knowledge of the network and will be used to generate colorized images from input infrared images during the inference process. The parameter values, including the color query parameters or embeddings 322, may be stored in memory accessible by the processor executing the inference process, such as described above with respect to the method 200. The method 400 then ends.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method of generating colorized image data for a single-channel image, comprising:

obtaining single-channel image data representing a single-channel image;

generating image feature data as a result of inputting the single-channel image data into an encoder;

generating a pixel decoder output through inputting the image feature data into a pixel decoder;

generating a color decoder output through inputting the image feature data into a color decoder; and generating colorized image data based on the color decoder output and the pixel decoder output, wherein the colorized image data represents a colorized version of the single-channel image.

2. The method of claim 1, wherein the single-channel image is an infrared image and the single-channel image data is infrared image data representing the infrared image.

3. The method of claim 2, wherein the method includes capturing the infrared image using an infrared image sensor.

4. The method of claim 1, wherein the color decoder includes at least one learnable parameter, and wherein the at least one learnable parameter is used along with the image feature data by the color decoder in order to generate the color decoder output.

5. The method of claim 4, wherein the color decoder is configured to use multi-headed self-attention (MSA) in order to determine the at least one learnable parameter.

6. The method of claim 1, wherein the color decoder is configured to perform attention based on visual features from at least two different scales.

7. The method of claim 1, wherein the pixel decoder output is representative of luminance, wherein the color decoder output is representative of chrominance, and wherein the luminance as represented by the pixel decoder output is combined with the chrominance as represented by the color decoder output in order to generate the colorized image data.

8. The method of claim 1, wherein the image feature data includes a plurality of feature maps, wherein the image feature data inputted into the pixel decoder includes two or more of the plurality of feature maps and the image feature data inputted into the color decoder includes at least one of the plurality of feature maps.

9. The method of claim 8, wherein the plurality of feature maps includes four feature maps each having a different resolution, and wherein the two or more feature maps inputted into the pixel decoder consists of three of the four feature maps, and the at least one feature map inputted into the color decoder consists of a fourth one of the four feature maps.

10. The method of claim 4, wherein the color decoder uses the at least one learnable parameter to generate chrominance information, and wherein the step of generating colorized image data further comprises generating colorized image data based on the chrominance information and the pixel decoder output.

11. A method of generating colorized image data for a single-channel image, comprising:

generating image feature data as a result of inputting single-channel image data into an encoder;

generating a color decoder output through inputting the image feature data into a color decoder, wherein the color decoder uses at least one learnable parameter that is trained to generate chrominance information; and generating colorized image data based on the chrominance information and the image feature data, wherein the colorized image data represents a colorized version of the single-channel image.

12. The method of claim 11, wherein the at least one learnable parameter is used along with the image feature data by the color decoder in order to generate the color decoder output.

13. The method of claim 12, wherein the color decoder is configured to use multi-headed self-attention (MSA) in order to determine the at least one learnable parameter.

14. The method of claim 11, wherein the color decoder is configured to perform attention based on visual features from at least two different scales.

15. The method of claim 11, further comprising generating a pixel decoder output through inputting the image feature data into a pixel decoder, wherein the pixel decoder output is representative of luminance, wherein the color decoder output is representative of the chrominance, and wherein the luminance as represented by the pixel decoder output is combined with the chrominance as represented by the color decoder output in order to generate the colorized image data.

16. The method of claim 11, wherein the single-channel image is an infrared image and the single-channel image data is infrared image data representing the infrared image.

17. The method of claim 16, wherein the method includes capturing the infrared image using an infrared image sensor.

18. The method of claim 11, wherein the method is performed by vehicle electronics of a vehicle.

19. The method of claim 18, wherein the vehicle electronics of the vehicle includes the infrared image sensor configured to capture infrared image data as the single-channel image data, and wherein the colorized image data represents a color version of a scene captured by the infrared image sensor.

20. The method of claim 15, wherein the image feature data includes a plurality of feature maps, wherein the image feature data inputted into the pixel decoder includes two or more of the plurality of feature maps and the image feature data inputted into the color decoder includes at least one of the plurality of feature maps.

* * * * *